R. L. TOLSON.

TRACTOR.

APPLICATION FILED OCT. 21, 1920.

Reissued Mar. 14, 1922.

15,308.

2 SHEETS—SHEET 1.

Inventor
Robert L. Tolson

By E. W. Bedford
Attorney

R. L. TOLSON.

TRACTOR.

APPLICATION FILED OCT. 21, 1920.

Reissued Mar. 14, 1922.

15,308.

2 SHEETS—SHEET 2.

Inventor
Robert L. Tolson

By E. W. Bradford
Attorney

UNITED STATES PATENT OFFICE.

ROBERT L. TOLSON, OF MEMPHIS, TENNESSEE, ASSIGNOR, BY MESNE ASSIGNMENTS, TO JOHN W. FARLEY, TRUSTEE, OF MEMPHIS, TENNESSEE.

TRACTOR.

15,308. Specification of Reissued Letters Patent. Reissued Mar. 14, 1922.

Original No. 1,323,126, dated November 25, 1919, Serial No. 211,371, filed January 11, 1918. Application for reissue filed October 21, 1920. Serial No. 418,603.

*To all whom it may concern:*

Be it known that I, ROBERT L. TOLSON, a citizen of the United States, residing at Memphis, in the county of Shelby and State of Tennessee, have invented certain new and useful Improvements in Tractors, of which the following is a specification.

This invention relates to a tractor which is primarily designed for use upon a farm to replace horses or mules, and the primary object of the invention is to provide a tractor structure of the four wheel drive type which is also constructed so that both the front and rear wheels may be steered in unison whereby the tractor may be turned in a relatively short space.

More specifically, the object of this invention is to provide a tractor structure including a supporting frame which is carried by arch axles and has its front and rear wheels connected to the lower ends of the arch axle by the usual type of stub axle and spindle to allow the wheels to be turned for steering the tractor and further to provide means connected to all of the wheels of the tractor for positively rotating the wheels to propel the tractor, which means includes a hollow shaft, through which the shaft which steers the wheels extends.

With the foregoing and other objects in view, this invention consists in such novel features of construction, combination and arrangemnet of parts as will be hereinafter more fully described, illustrated in the accompanying drawings and claimed.

In describing the invention in detail, reference will be had to the accompanying drawings wherein like characters designate like and corresponding parts throughout the several views, and in which:

Figure 3 is a fragmentary side elevation of the tractor showing a radius rod attached to the front axle structure.

Figures 1, 2:
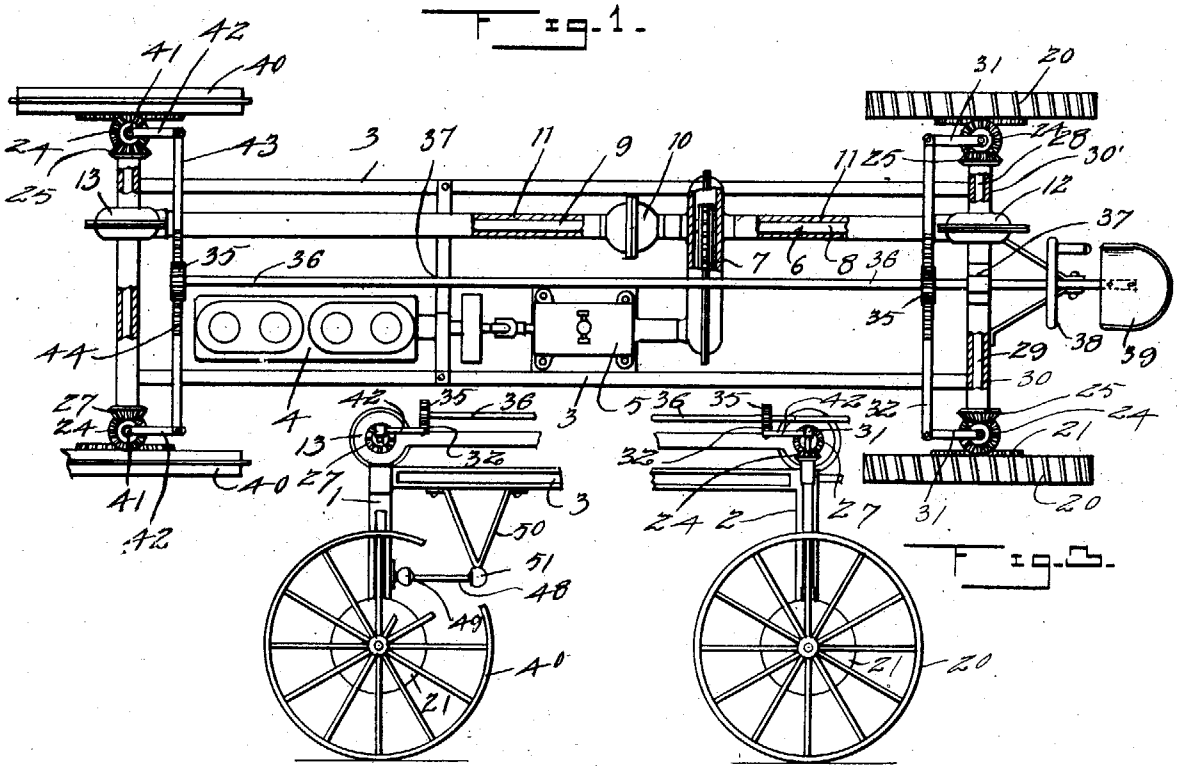
Figure 1 is a top plan view of the tractor having parts broken away.
Figure 2 is a fragmentary vertical section through the tractor.
Figure 2:
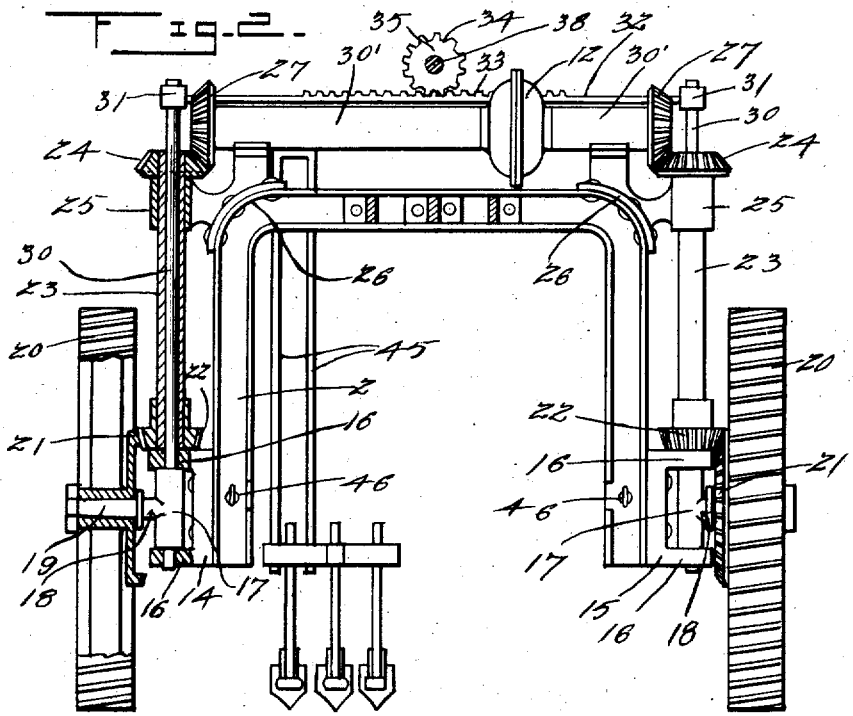

Referring more particularly to the drawings, 1 designates the front arch axle of the tractor and 2 designates the rear arch axle. These arch axles may be made of channel iron or any similar material and they are arched to allow the tractor to pass over corn or other growing crops when it is used for drawing a cultivator.

The supporting frame 3 of the tractor is fixed rigidly to the rear axle 2 as shown in Figure 3 and is connected to the front axle 1 by a horizontal pivot member or king-bolt (not shown) passing through the middle of the U-shaped body member of the axle and it supports an engine or motor 4 of any standard make which is connected to a gear shift structure 5 of the ordinary construction. The gear shift structure 5 is connected to the main drive shaft 6 of the tractor through the medium of a silent chain 7. The shaft 6 is composed of sections 8 and 9 which are connected by a universal joint 10. The shaft sections 8 and 9 are inclosed in suitable casings 11 and they extend longitudinally of the frame of the tractor. The shaft section 8 has its rear end connected to an ordinary differential gear structure 12 while the forward end of the shaft section 9 is connected to an ordinary differential gear structure 13. The rear arch axle 2 has a pair of castings 14 and 15 attached to the outer sides of the lower ends of the legs of the same and these castings include horizontally extending bearing arms 16. The horizontal bearing arms 16 rotatably support the vertical portions 17 of stub shafts 18 upon the spindles 19 of which are mounted the rear supporting wheels 20 of the tractor. The rear supporting wheels 20 of the tractor have bevel gears 21 attached thereto which mesh with gears 22. The gears 22 are mounted upon the lower ends of hollow shafts 23 and these shafts have beveled gears 24 mounted upon their upper end. The vertical hollow shafts 23 are supported by suitable bearings 25 which are attached in any suitable manner as shown at 26 to the arch axle 2. The beveled gears 24 mesh with beveled gears 27 which are carried by the shafts 28 and 29 that are operatively connected to the shaft section 8 through the differential gear structure 12. Suitable housings 30′ inclose the shafts 28 and 29.

Vertical shafts 30 extend through the hollow shafts 23 and have their lower ends connected to the stub axles 18. Arms 31 are connected to the upper end of the shaft 30 and to a cross rod 32. The cross rod 32 has rack teeth formed upon the upper surface of the same which mesh with the teeth 34 of a gear 35. The gear 35 is carried by the steering post or shaft 36. The steering post 36 is supported by suitable bearings 37 and it has a steering wheel 38 positioned upon the rear end of the same which is positioned in close proximity to the seat 39 so that the operator of the tractor may conveniently reach the steering wheel 38 from the seat 39 for steering the tractor.

The front supporting wheels 40 are driven from the shaft section 9 in identically the same manner in which the rear supporting wheels 20 are driven and they are steered by vertical shafts 41 which extend through the hollow operating shaft of the front gears and have arms 42 connected to their upper ends. The arms 42 are connected to a cross rod 43 which has rack teeth 44 formed upon its upper surface that mesh with a gear 35 carried by the forward end of the steering post 36 so that both the front wheels 40 and the rear wheels 20 will be steered in unison for guiding the tractor.

Figure 4:
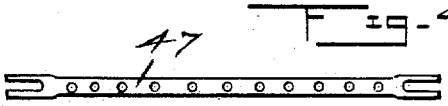
Figure 4 is a view of a draw bar which is attached to the tractor structure.

The supporting frame 3 of the tractor has a plurality of rods 45 connected thereto at any suitable place the lower ends of which rods may be connected to ordinary cultivating shovel gangs or any other agricultural implements suitable to be connected in this manner to the tractor and the rear arch axle 2 has a pair of eye bolts 46 carried thereby to which a draw bar 47, as illustrated in Figure 4 of the drawings, may be connected to provide means for connecting the tractor to a wagon, grain drills or similar devices.

A radius rod 48 is connected to the front axle 1 by a ball and socket joint 49 and to a bracket 50 depending from a side member of frame 3 by a second ball and socket joint 51. Preferably there will be bracket and radius rod for each side of the front axle.

When the tractor passes over rough ground the front axle can pivot to a limited extent on the king-bolt independently of the rear axle 2 and frame 3 and parts carried thereby, thus avoiding rocking of the frame and straining of its parts such as would take place if the whole were rigid. Such a horizontal pivot structure for the axle of a vehicle has been used prior to my invention, and details thereof are not claimed in this application.

It will be readily understood that the braces 50 and radius-rods 48 will prevent the front axle from rocking in a direction longitudinally of the machine, which would have a tendency to break the king-bolt, while they permit limited free rocking of the axle transversely of the machine. In this way any wheel may descend into a depression in the ground independently of the others and if it is on the front axle, this will swing on the king-bolt, while if it is on the rear axle the entire body can sag at one side, the front of the body pivoting on the king-bolt and the brace and radius-rod pushing or pulling on the front axle as necessary to hold it at the proper angle to the body.

From the foregoing description taken in connection with the accompanying drawings the advantages of construction and the method of operation of the improved tractor will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a tractor, an axle having an integral inverted U-shaped body with flanges extending therefrom, separate bearing brackets on said shoulders having flanges matching those of the body member and secured thereto, the lower surface of each of said brackets corresponding in shape to that of the shoulder and extending from a point above the shoulder to a point below the same, thus forming a re-enforcement for the shoulder of the axle, substantially as set forth.

2. In a tractor, an inverted U-shaped axle, separate bearing brackets having bases conforming to the respective shoulders of the U-shaped member and rigidly attached thereto, each bracket covering the corresponding shoulder and acting to re-enforce the same, substantially as set forth.

3. In a tractor structure, an inverted U-shaped axle and separate bearing brackets covering and permanently secured to the shoulders of the axle, each of said brackets having a laterally extending arm with an integral annular bearing for a vertical shaft and also having an upwardly extending arm and a differential gearing supported above the axle on said arms, traction wheels on the axle geared to said vertical shafts, and said vertical shafts being geared to the oppositely extending shafts of said differential gearing, substantially as set forth.

4. In a tractor structure, an inverted, U-shaped axle member, separate brackets attached to each shoulder of the U-shaped member and covering the shoulder to re-enforce the axle at this point, and brackets attached to each side portion at its lower extremity, the upper brackets having each an upwardly extending arm and an outwardly extending arm, a power transmitting shaft supported on the upper arms and a power transmitting shaft supported in bearings on the brackets at each side of the axle, the latter shafts being geared to the first and to the driving wheels.

5. In a tractor, front and rear sets of wheels, axles therefor carrying bearings, hollow shafts in the bearings having means for driving each wheel, a shaft concentric with each hollow shaft carrying a stub shaft for steering the adjacent wheel, a rock arm at the upper end of each of the second set of shafts, bars connecting the front and rear pairs of rock arms, and a steering shaft connected to both bars and having a steering wheel at the rear of the tractor, substantially as set forth.

6. In a tractor structure, an inverted U-shaped axle, a pair of brackets at each side thereof, the lower brackets each having two projecting bearings, a hollow driving shaft extending through the bearing of the upper bracket and resting on the upper bearing of the lower bracket and carrying a gear for driving a traction wheel, a second shaft extending through the hollow shaft and the bearings of the lower bracket, and a rock arm on the second shaft between the bearings of the lower bracket, said rock arm carrying and steering said traction wheel.

7. In a tractor structure, an inverted U-shaped axle having an upper unitary bearing sleeve and a pair of spaced lower unitary bearing sleeves, a hollow shaft journaled in the upper bearing sleeve and carrying a gear resting thereon and a second gear resting on one of the lower sleeves and adapted to mesh with a gear on a traction wheel to drive the same, substantially as set forth.

8. In a tractor structure, an inverted U-shaped axle having an upper unitary bearing sleeve and a pair of spaced lower unitary bearing sleeves, a hollow shaft supported by said sleeves in driving relation to a traction wheel, a solid shaft within the hollow shaft passing through each of said bearing sleeves and having a sleeve thereon between the two lower sleeves, said sleeve carrying a rock arm for steering said traction wheel, substantially as set forth.

9. In a tractor, an inverted U-shaped axle, upper and lower annular bearings projecting laterally therefrom, wheels on the axles, and concentric driving and steering shafts for said wheels supported in said bearings, one shaft extending through one of said bearings and the other through both, substantially as set forth.

10. In a tractor, an inverted U-shaped axle, upper and lower annular bearings projecting laterally therefrom, wheels on the axles and concentric driving and steering shafts for said wheels supported in said bearings comprising a shaft at each side of the axle passing through said upper and lower bearings and a hollow shaft passing through the upper bearing only, substantially as set forth.

11. In a tractor structure, a pair of arched axles, means rigidly connecting the axles together, spindles pivotally carried by the lower ends of the arched axles, wheels rotatably mounted on the spindles, shafts secured to the spindles and extending above the arched axles, means connecting the forward and rear pairs of shafts together, a steering shaft extending longitudinally of the tractor structure, a steering wheel keyed to the near end of said steering shaft, and means operatively connecting the steering shaft with the means connecting the forward and rear pairs of said spindle carried shafts, as and for the purpose specified.

12. In a tractor, a main frame, a pair of inverted U-shaped axles on the frame, traction wheels on each axle, common means to steer all the wheels and common means to drive all the wheels including driving and steering devices for each set of wheels located at the outer sides of the corresponding axle, and longitudinal connections therebetween located above the level of the axles, substantially as set forth.

13. In a tractor, a main frame, a pair of inverted U-shaped axles on the frame, stub axles projecting from each U-shaped axle, traction wheels thereon, a common steering shaft for all the wheels located above the level of the upper portions of the axles, a common driving shaft similarly located, and connections extending from said shafts along the outer sides of the axles to the individual wheels, substantially as set forth.

14. In a tractor, a main frame, a pair of inverted U-shaped axles on the frame, stub axles projecting from each U-shaped axle, traction wheels thereon and means for steering and driving the wheels on each axle, comprising a steering shaft extending longitudinally of the tractor above the level of the axles, a driving shaft similarly located, concentric vertical shafts at each side of each axle, one of said shafts being connected to the steering shaft and to a stub axle and the other being connected to the driving shaft and having driving connection with the wheel on said stub axle, substantially as set forth.

15. In a tractor, a main frame, a pair of inverted U-shaped axles on the frame, stub axles projecting from each U-shaped axle, traction wheels thereon and means for steering and driving the wheels on each axle, comprising a steering shaft extending longitudinally of the tractor above the level of the axles, a driving shaft similarly located, concentric shafts at each side of the U-shaped axle, rock arms on one of each pair of said concentric shafts and a transverse shaft resting on the U-shaped axle and geared to the main driving shaft and to a pair of said concentric shafts for driving the traction wheels.

16. In a tractor, a main frame, a pair of U-shaped axles on the frame, a pair of concentric shafts journaled at each side of each axle, one of said concentric shafts carrying a gear and the other a stub-axle, and a traction wheel on each stub-axle carrying a driving gear meshing with said first-named gear, substantially as set forth.

In witness whereof, I have hereunto set my hand and seal at Memphis, Tennessee, this 23 day of September, A. D., nineteen hundred and twenty.

ROBERT L. TOLSON. [L. S.]

Witnesses:

JOHN W. FARLEY,

F. M. BAILEY.